Jan. 23, 1934. J. L. KIMBALL 1,944,841
OPERATING VALVES FROM ELECTRIC SOLENOIDS AND THE LIKE
Filed April 27, 1931
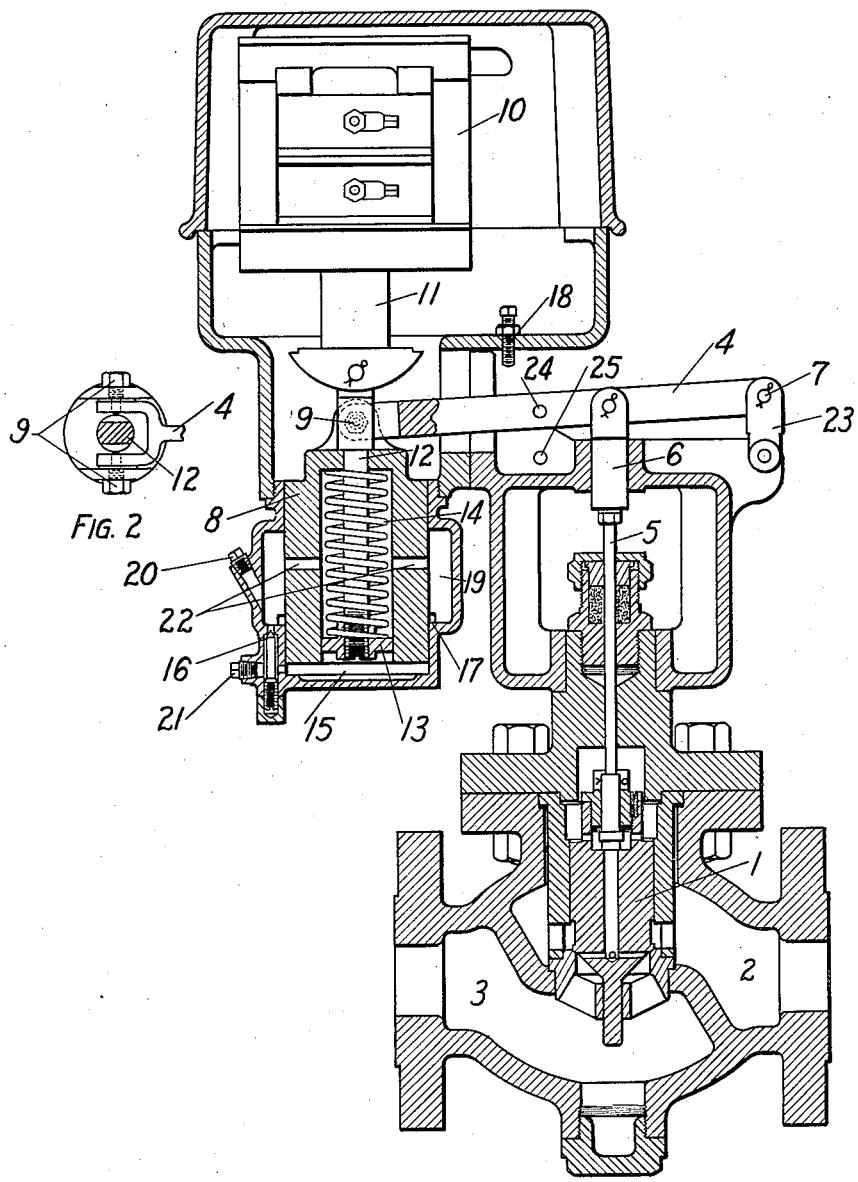
INVENTOR
James L Kimball Patented Jan. 23, 1934

1,944,841

UNITED STATES PATENT OFFICE

1,944,841

OPERATING VALVES FROM ELECTRIC SOLENOIDS AND THE LIKE

James Lewis Kimball, Danvers, Mass., assignor to Ruggles-Klingemann Mfg. Co., Salem, Mass.

Application April 27, 1931. Serial No. 533,275

8 Claims. (Cl. 137—139)

The general object of my invention relates to improved means for operating valves from electric solenoids and the like, in such a manner as to prevent shocks or water hammer.

One of the more specific objects of my invention is to provide effective means whereby the valve is moved at a relatively slower speed than that of the solenoid during the initial opening and final closing movement. Another object is to provide means to insure the positive closing of the magnetic gap of the solenoid when energized, regardless of whether the valve operated or not, thereby cutting down the high inrush current and protecting the solenoid winding from being damaged by excessive heat rise.

A further object is to provide means whereby the solenoid plunger delivers a hammer blow to the valve operating means when de-energized, thus providing the necessary inertia to insure a more positive closing movement.

These and other features of novelty characterizing my invention will be more fully described and claimed, having reference to the accompanying drawing, in which Fig. 1 shows a vertical diagrammatic sectional view of one embodiment of my invention. Fig. 2 shows plan view of the connection between valve lever and large dash pot plunger. In the drawing (1) shows a preferred type of balanced pressure valve controlling the flow of fluid from the inlet (2) to the outlet (3). Valve (1) is connected to lever (4) by means of stem (5) and clevis (6). Lever (4) is fulcrumed at (7) and the opposite end is pivoted to the large dash pot plunger (8) at point (9).

The solenoid (10) has solenoid plunger (11) and this plunger has an extension rod (12) with a shoulder normally resting on the upper end of plunger (8). The lower end of rod (12) has a threaded portion to which is attached a smaller dash pot plunger (13) operating within the larger plunger (8). A coil spring (14) is located within the larger plunger (8), the lower end resting on plunger (13) and the upper end on plunger (8). This spring (14) is practically at its free length when the valve is in its normal position as shown. The gradient of this spring is such, as compared with the power of the solenoid, that the solenoid plunger (11) can make a full upward stroke without imparting a movement to plunger (8).

In the operation of this valve, the solenoid (10) is energized by the electric current and the plunger (11) moves rapidly upward to close up its magnetic field or gap. This operation carries with it the upward movement of plunger (13) and the compression of the spring (14). The plunger (8) remains stationary at the bottom of its stroke because of the fact that the upward movement of plunger (13) has created a partial vacuum below the plunger (8) in space (15). The upward movement of the plunger compresses spring (14) to the full power of the solenoid and consequently exerts a force to raise plunger (8) as soon as the vacuum is destroyed in space (15). Soon after the solenoid has been energized and spring (14) compressed, the vacuum created in space (15) will be dissipated through a small leak past needle valve (16), the plunger (8) then starts on its upward stroke under the compression of spring (14) to slowly open the valve (1). As soon as the bottom face of the plunger (8) reaches the enlarged part of the dash pot cylinder at point (17) all dash pot effect is broken and from this point on to a full open valve the movement becomes much more rapid.

On the closing movement the solenoid being de-energized is forced downward rapidly until the shoulder on stem (12) comes in contact with the top of plunger (8) which effects a hammer blow to start the valve closing. The valve closing movement being quite rapid until the bottom of the plunger (8) enters the lower end of the dash pot cylinder from this point on to a closed valve position the movement is relatively slower, but is adjustable by the degree of opening of needle valve (16). It will be understood that the force to close the valve is the dead heft or gravity force of all the moving parts. This gravity force is approximately one half the pulling power of the solenoid, so it will be seen that equal forces are applied in both the opening and closing movement.

A hammer blow effect is obtained by limiting the upward movement of lever (4) by means of stop screw (18). By adjusting this screw, the degree of downward motion to plunger (11) before shoulder on rod (12) comes in contact with the top of large plunger (8), and consequently the degree of hammer blow to start the closing movement is varied. It will be understood that with alternating current solenoids, the inrush or ampere flow with open magnetic field will be much greater than the normal flow when the magnetic field or gap is closed. Solenoid coils are usually so rated that with a closed magnetic field the current consumption will be cut down to what is considered normal heat rise on continuous rated service, but for any reason should the magnetic gap not be closed when the solenoid is energized, then the high rate of current flow will soon produce an excessive heat rise and the windings will be damaged. The same applies to direct current solenoids, which have what is known as low resistance pick up coils which are thrown in series with the holding coil by means of a switch operated by the solenoid, at or slightly before the magnetic gap is closed. These pick up coils are for intermittent service and consequently, that unless the switch operates to throw in additional resistance of the holding coil the pick up coil will be burned out. This often happens with both A. C. and D. C. solenoids, due to valve sticking and requiring more power of the solenoid. It is for this reason that I find it desirable to connect the solenoid to the valve operating means by means of a spring, the compression power of which will in no case exceed the power of the solenoid, to effect a full and complete stroke and close up the magnetic field.

The solenoid plunger must not only operate to close up its magnetic gap to protect its windings, but it must operate rapidly without retarding to any great extent its normal speed. It is for this reason that dash pots cannot be used for slowing down the operation of the solenoid operated valves without a yielding connection between the solenoid plunger and the dash pot.

In my invention, I am enabled to use oil in the dash pot cylinder (19) to effect a very slow opening and closing movement of the valve without danger of retarding the operation of the solenoid, and consequent damage to its coil windings.

This dash pot is filled to the proper height through pipe plug connection (20). Pipe plug (21) is for drainage purposes.

When the solenoid is energized, the rapid movement of the plunger (13) expells any surplus fluid in the chamber around the spring through ports (22).

Solenoid valves heretofore have been objectionable on fluids such as water, because of their necessary rapid movement causing water hammer. It will now be seen that I have overcome this objection and at the same time devised means for protecting the solenoid windings against being damaged by a high inrush current. I have also incorporated in my novel arrangement hammer blow means to insure a more positive action in starting the valve toward its closed position on the deenergizing of the solenoid.

While I have described my invention in relation to an energized solenoid for an open valve position, the operation can be reversed by changing fulcrum link (23) to the opposite side of the valve stem in pin locations (24) and (25). In this position, the solenoid is energized to close the valve but the novel features are of equal importance in one operation as in the other.

I claim:

1. In combination, a valve, a dash pot operatively connected with said valve and arranged to effect operation of the valve in one direction by gravity force, a second dash pot within the first named dash pot, a solenoid for operating the valve in the opposite direction, said solenoid being mechanically connected with the last named dash pot, and a yielding spring connection between the first and second named dash pots.

2. In combination, a valve, a solenoid for the operation of said valve, means operated by the solenoid when energized for generating a force to operate the valve, means for retarding the operation of the valve in relation to the operation of the solenoid, said last named means effecting a relatively slow motion in the initial opening and final closing of the valve, and means whereby a hammer blow is delivered by the solenoid when de-energized to assist in the initial closing movement.

3. In apparatus for effecting delayed action in valve operation, a valve means to operate said valve, a dash pot interposed between the valve and the valve operating means, a spring under tension normally holding the valve operating means in engagement with the dash pot, but providing a yielding connection whereby the valve operating means may be operated independent of the valve, said dashpot providing means for effecting delayed action, whereby only the initial opening and final closing movement of the valve is relatively slow regardless of the speed of the valve operating means.

4. In apparatus for effecting delayed action in valve operation, a valve casing having a valve therein, a dash pot rigidly connected with the valve casing, a dash pot plunger operatively connected with the valve, said plunger being of suitable weight to operate the valve in one direction by gravity force, means to operate said valve in the opposite direction, a spring under tension normally holding the valve operating means in engagement with the dash pot plunger, but providing a yielding connection whereby the valve operating means may be operated independent of the valve, said dash pot providing delayed action whereby only the initial opening and final closing movement of the valve is relatively slow regardless of the speed of the valve operating means.

5. In apparatus for effecting delayed action in valve operation, a valve casing having a valve therein a dash pot rigidly connected with the valve casing, a dash pot plunger operatively connected with the valve and being so arranged as to retard only the initial opening and final closing movement of the valve, said dash pot plunger being of suitable weight to operate the valve in one direction by gravity force, a solenoid for operating the valve in the opposite direction, a spring under tension normally holding the solenoid in engagement with the dash pot plunger, but providing a yielding connection whereby the solenoid may be operated to its full extent in advance of the valve operation.

6. In combination, a valve, means to operate said valve, a dash pot operatively connected with said valve, said dash pot being so arranged as to effect a relatively slow motion in the initial opening and final closing movements only of said valve, and a yielding spring connecting the dash pot with the valve operating means.

7. In combination, a valve, electromagnetic means for operating said valve, a dash pot operatively connected with said valve, said dash pot being so arranged as to effect a relatively slow motion in the initial opening and final closing movements only of the valve, and a yielding connection between the dash pot and the electromagnetic operating means.

8. In combination, a valve, electromagnetic means for operating said valve, a dash pot interposed between the valve and the valve operating means, said dash pot having a dash pot plunger operatively connected with said valve and so arranged as to provide a relatively slow motion in the initial opening and final closing movements only of said valve, and a yielding spring connecting the dash pot plunger with the electromagnetic operating means.

JAMES LEWIS KIMBALL.